May 29, 1956 F. C. WALTHER 2,747,924
ADJUSTABLE FOOT REST FOR VEHICLES
Filed Aug. 1, 1952
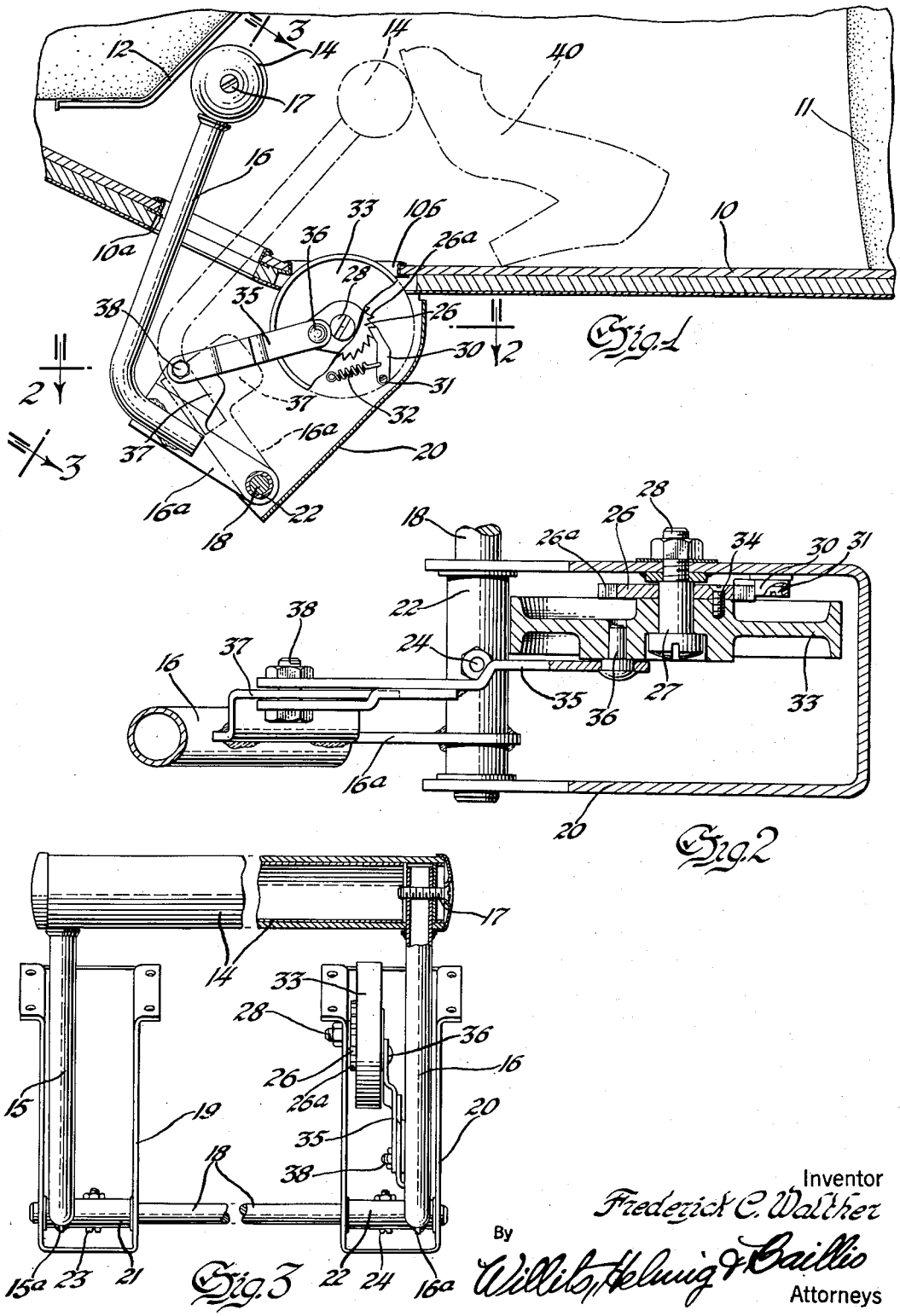
Inventor
Frederick C. Walther
By Willis, Helwig & Baillio
Attorneys

United States Patent Office

2,747,924
Patented May 29, 1956

2,747,924

ADJUSTABLE FOOT REST FOR VEHICLES

Frederick C. Walther, Grosse Pointe, Mich., assignor to General Motors Corporation, Detroit, Mich., a corporation of Delaware Application August 1, 1952, Serial No. 302,082

10 Claims. (Cl. 296—75)

This invention relates to an adjustable foot rest, and more particularly to an adjustable foot rest for an automobile or other vehicle.

One feature of the invention is that it provides an improved adjustable foot rest; another feature of the invention is that it provides a foot rest which may be moved reciprocably through a plurality of adjusted positions; a further feature of the invention is that improved means are provided for controlling movement of the foot rest and for holding the foot rest in any selected one of a plurality of adjusted positions; still another feature of the invention is that rotation of an operating member in one direction will cause reciprocating movement of the foot rest; and yet a further feature of the invention is that the mounting and substantially all of the operating means for the foot rest may be located below the floor of an automobile or other vehicle, the only space above the floor which is utilized being the space occupied by the foot rest member itself and a portion of the supporting arms therefor and a small portion of the operating means.

Other features and advantages of the invention will be apparent from the following description of the invention and from the drawings, in which:

Fig. 1 is a fragmentary longitudinal vertical section through the floor of an automobile having the improved foot rest therein, the movable parts being shown in solid lines in one position and in broken lines in another position;

Fig. 2 is an enlarged section taken along the line 2—2 of Fig. 1; and

Fig. 3 is a transverse section taken along the line 3—3 of Fig. 1, the center portion of the foot rest and its supporting means being broken away.

Referring now more particularly to the drawings, the foot rest is shown mounted in the rear passenger compartment of an automobile. 10 is the automobile floor, 11 is the front portion of the rear seat of the automobile, and 12 is the back portion of the front seat of the automobile.

A foot rest member 14 is carried on L-shaped arms 15 and 16, said arms being secured to the opposite ends of the foot rest member 14 by bolts, as indicated at 17. The arms 15 and 16 extend through openings 10a in the floor 10, and are pivotally mounted at the lower end on a shaft 18 which extends transversely of the vehicle below the floor thereof and is rotatably journalled in the side walls of channel-shaped housing brackets 19 and 20 located adjacent opposite sides of the vehicle. Sleeves 21 and 22 are secured to the shaft 18 within the respective housing brackets by means of bolts 23 and 24, said sleeves having their ends in abutting relation with the walls of the respective housing brackets 19 and 20. In order to simplify the construction and to conserve space adjacent the housing brackets, the lower end of each of the respective arms 15 and 16 comprises a sheet metal portion 15a and 16a each of which is welded to the main tubular portion of the associated arm and the associated sleeve on the shaft 18.

A ratchet wheel 26 is rotatably mounted in the channel-shaped housing member 20 on a sleeve 27 which is carried on a bolt 28, said bolt extending through and being secured to the wall of the bracket 20. The wheel 26 has a set of teeth 26a which may extend entirely around its periphery. A pawl 30 pivotally mounted on the wall of the bracket 20 engages the teeth of the ratchet wheel 26 to prevent rotation of the wheel in a clockwise direction, as the parts appear in Fig. 1. The pawl 30 is pivotally mounted on the wall of the bracket 20 by means of a bolt 31, and a spring 32 urges the pawl into yieldable engagement with the teeth of the ratchet wheel.

The ratchet wheel 26 is connected by means of a bolt 34 to a disk 33 which is also rotatably mounted on the sleeve 27. As shown in Fig. 1 the periphery of the disk 33 projects through an opening 10b in the floor 10 and extends above the level of said floor.

A link 35 has one end pivotally mounted on the disk 33 by means of a pin 36, which pin is spaced from the axis of rotation of the ratchet wheel and disk to provide an eccentric mounting. The other end of the link 35 is articulated to a projecting flange 37 which extends from the sheet metal portion 16a of the arm 16, a bolt 38 providing this pivotal connection.

In the operation of the device, rotation of the disk 33 and ratchet wheel 26 in a counterclockwise direction causes reciprocating movement of the foot rest member 14, and the operation of the pawl 30 provides for a plurality of selected steps or positions of adjustment within the range of movement of the foot rest member. Referring to Fig. 1, if the disk 33 is rotated in a counterclockwise direction by the foot 40 of a passenger in the vehicle, the foot rest member 14 will move from its solid line position toward its broken line position. When the disk 33 has rotated through one half revolution the foot rest will be in the position shown in broken lines in Fig. 1, and continued rotation of the disk 33 through one full revolution will reciprocate the foot rest member back to its solid line position. The use of a disk in place of a rod or handle provides a distinct advantage in that the foot rest may be operated in all its positions by the toe of a passenger in the vehicle engaging the portion of the periphery of the disk which projects through the opening 10b in the vehicle floor.

The number of steps of adjustment is dependent upon the number and spacing of the teeth 26a on the ratchet 26, and the pawl 30, which always engages one of the teeth of the ratchet, prevents clockwise rotation of the ratchet wheel and thereby locks the foot rest in any one of the adjusted positions which has been selected by the operator. In order to return the foot rest from its broken line position to its solid line position it is not necessary to rotate the disk 33 directly, but foot pressure of the operator on the foot rest member 14 will serve to rotate the disk and ratchet wheel through the second half of a complete revolution, since such movement of the foot rest member will operate through the link 35 to rotate the disk 33 and sprocket 26 in a counterclockwise direction whereby the pawl slips over the teeth of the ratchet wheel.

The point of pivotal connection of the link 35 on the arm 16 is considerably closer to the pivotal mounting point of said arm on the shaft 18 than it is to the foot rest member 14, thereby providing for motion multiplication, the arm 16 acting as a motion multiplying lever.

While I have shown and described one embodiment of my invention, it is subject to many modifications. Changes, therefore, in the construction and arrangement may be made without departing from the spirit and scope of the invention as set forth in the appended claims.

What is claimed is:

1. An adjustable foot rest of the character described, including: a foot rest; means for mounting said foot rest for reciprocating movement; a member movable in only one direction; means constantly restraining movement of said member except in said one direction; and means connecting said foot rest and member to provide for reciprocating movement of said foot rest upon movement of said member in said one direction.

2. An adjustable foot rest of the character described, including: a foot rest; means for mounting said foot rest for reciprocating movement; a rotatable member; restraining means permitting rotation of said member in only one direction; means constantly urging said restraining means into engagement with said rotatable member; and means connecting said foot rest and said rotatable member to provide for reciprocating movement of said foot rest upon rotatable movement of said member in said one direction.

3. An adjustable foot rest of the character described, including: means providing a foot rest; a rotatable member; restraining means for preventing rotation of said member in one direction; spring means constantly holding said restraining means in engagement with said rotatable member; and a link having one end pivotally connected to said member at a point spaced from the axis of rotation thereof and having the other end connected to said first mentioned means to provide for reciprocating movement of said first mentioned means upon rotation of said member.

4. An adjustable foot rest of the character described, including: means providing a foot rest; a rotatably mounted ratchet wheel; pawl means engaging the teeth of said wheel and preventing rotation thereof in one direction; a spring constantly holding said pawl against said ratchet wheel; and a link having one end pivotally connected to said wheel at a point spaced from the axis of rotation thereof and having the other end connected to said first mentioned means to provide for reciprocating movement of said first mentioned means upon rotation of said wheel.

5. An adjustable foot rest of the character described, including: a foot rest member; movably mounted support means for said member; a rotatably mounted ratchet wheel; pawl means engaging the teeth of said wheel and preventing rotation thereof in one direction; a spring constantly holding said pawl against said ratchet wheel; and means connecting said wheel and said support means to provide for reciprocating movement of said foot rest member upon rotation of said wheel.

6. An adjustable foot rest of the character described, including: a foot rest member; a pivotally mounted arm carrying said member; a rotatably mounted ratchet wheel; pawl means engaging the teeth of said wheel and preventing rotation thereof in one direction; spring means constantly urging said pawl into yieldable engagement with the teeth of said wheel; and a link having one end pivotally connected to said wheel at a point spaced from the axis of rotation thereof and having the other end pivotally connected to said arm to provide for reciprocating movement of said member upon rotation of said wheel.

7. An adjustable foot rest of the character described, including: a foot rest member; a pivotally mounted arm carrying said member; a rotatably mounted ratchet wheel; a pawl engaging the teeth of said wheel and preventing rotation thereof in one direction; a link having one end pivotally connected to said wheel at a point spaced from the axis of rotation thereof and having the other end pivotally connected to said arm to provide for reciprocating movement of said member upon rotation of said wheel; and operating means comprising a disk larger than said wheel and connected to said wheel to cause rotation thereof.

8. In a vehicle having a supporting floor, an adjustable foot rest of the character described, including: a foot rest member above said floor; a pivotally mounted arm carrying said member and extending below said floor; a ratchet wheel rotatably mounted below said floor; a pawl engaging the teeth of said wheel and preventing rotation thereof in one direction; a link having one end pivotally connected to said wheel at a point spaced from the axis of rotation thereof and having the other end pivotally connected to said arm at a point below said floor to provide for reciprocating movement of said member upon rotation of said wheel; and a disk connected to said wheel and having its periphery projecting above said floor to facilitate rotation of said wheel.

9. In a vehicle having a supporting floor, an adjustable foot rest of the character described, including: a foot rest member above said floor; a pivotally mounted arm carrying said member and extending below said floor; a ratchet wheel rotatably mounted below said floor; a pawl engaging the teeth of said wheel and preventing rotation thereof in one direction; spring means urging said pawl into yieldable engagement with the teeth of said wheel; a link having one end pivotally connected to said wheel at a point spaced from the axis of rotation thereof and having the other end pivotally connected to said arm at a point below said floor to provide for reciprocating movement of said member upon rotation of said wheel; and a disk connected to said wheel and having its periphery projecting above said floor to facilitate rotation of said wheel, the point of connection of said link on said arm being closer to the pivotal axis of said arm than to said foot rest, whereby said arm acts as a motion multiplying lever.

10. An adjustable foot rest of the character described, including: a foot rest member; a pivotally mounted arm carrying said member; a rotatably mounted ratchet wheel; spring-biased pawl means engaging the teeth of said wheel and preventing rotation thereof in one direction; a link having one end pivotally connected to said wheel at a point spaced from the axis of rotation thereof and having the other end pivotally connected to said arm to provide for reciprocating movement of said member upon rotation of said wheel; and operating means comprising a disk larger than said wheel and connected to said wheel to cause rotation thereof.

References Cited in the file of this patent

UNITED STATES PATENTS

| Number | Name | Date |
| --- | --- | --- |
| 175,515 | Smidt et al. | Mar. 28, 1876 |
| 880,730 | Grout | Mar. 3, 1908 |
| 1,283,578 | Smith | Nov. 5, 1918 |
| 1,703,237 | Holtkamp | Feb. 26, 1929 |
| 2,032,157 | Van Dresser et al. | Feb. 25, 1936 |
| 2,202,857 | Jacobs | June 4, 1940 |
| 2,217,352 | Todd et al. | Oct. 8, 1940 |
| 2,591,598 | Owler | Apr. 1, 1952 |